(12) United States Patent
Akimoto et al.

(10) Patent No.: US 7,618,474 B2
(45) Date of Patent: Nov. 17, 2009

(54) NICKEL POWDER, CONDUCTIVE PASTE, AND MULTILAYER ELECTRONIC COMPONENT USING SAME

(75) Inventors: Yuji Akimoto, Fukuoka (JP); Kazuro Nagashima, Ohnojo (JP); Hidenori Ieda, Dazaifu (JP)

(73) Assignee: Shoei Chemical Inc., Tokyo (JP)

( * ) Notice: Subject to any disclaimer, the term of this patent is extended or adjusted under 35 U.S.C. 154(b) by 256 days.

(21) Appl. No.: 11/602,062

(22) Filed: Nov. 20, 2006

(65) Prior Publication Data

US 2007/0125195 A1 Jun. 7, 2007

(30) Foreign Application Priority Data

Dec. 7, 2005 (JP) ............................. 2005-352925

(51) Int. Cl.
  *B22F 1/00* (2006.01)
(52) U.S. Cl. ........................................ 75/252; 428/403
(58) Field of Classification Search ................... 75/252; 428/403; *B22F 1/02*
  See application file for complete search history.

(56) References Cited

U.S. PATENT DOCUMENTS

2005/0121656 A1  6/2005 Choi et al.
2007/0254156 A1* 11/2007 Yoshida ...................... 428/403

FOREIGN PATENT DOCUMENTS

| CN | 1404424 A | 3/2003 |
| CN | 1539581 A | 10/2004 |
| JP | 10-106351 | 4/1998 |
| JP | 11080816 | 3/1999 |
| JP | 2000-45001 | 2/2000 |
| JP | 2000-045001 | 2/2000 |
| JP | 2001-284161 | 10/2001 |
| JP | 2004-244654 | 9/2004 |
| JP | 2004-244654 A * | 9/2004 |
| WO | WO 01/60551 A2 * | 8/2001 |

OTHER PUBLICATIONS

Abhijit S. Gurav, et al., "Selection of Nickel Powders for Base Metal Electrodes in MLCC", $22^{nd}$ Capacitor and Resistor Technology Symposium CARTS 2002, pp. 81-88, (Mar. 26-28, 2002).
A. Johgo, "Properties of Oxide Surface Layer of Metal Ultrafine Particles—Nickel Ultrafine Particles", Research Digest on Ultrafine Particles by Hayashi's Project Group, pp. 91-96, distributed Sep. 1986.
A. Johgo, "2.7 Properties of the Oxide Surface Layer of Metal Ultrafine Particles", Ultrafine Particles—Creative Science and Technology, pp. 184-190, published Sep. 20, 1988.
Chinese Office Action.

* cited by examiner

*Primary Examiner*—Roy King
*Assistant Examiner*—Weiping Zhu
(74) *Attorney, Agent, or Firm*—Flynn, Thiel, Boutell & Tanis, P.C.

(57) ABSTRACT

A nickel powder with a mean particle size of 0.05 to 1.0 μm, the nickel powder having a thin oxidized layer of nickel on a surface thereof, an oxygen content of 0.3 to 3.0 wt. % and a carbon content of 100 ppm or less per specific surface area of 1 $m^2$/g of the powder, in a weight proportion of carbon to the nickel powder of unit weight. When the powder is used for a conductive paste for forming inner electrode layers of a multilayer electronic component, it enables a decrease in the residual carbon amount after a binder removal process, thereby making it possible to obtain a multilayer ceramic electronic component excellent electrical characteristics and high reliability in which electrode layers excelling in continuity are formed without decreasing the strength and electrical characteristics of the electronic component or creating structural defects.

6 Claims, No Drawings

NICKEL POWDER, CONDUCTIVE PASTE, AND MULTILAYER ELECTRONIC COMPONENT USING SAME

BACKGROUND OF THE INVENTION

1. Field of the Invention

The present invention relates to a nickel powder which is, in particular, suitable for forming electrodes in multilayer ceramic electronic components, such as multilayer capacitors, multilayer inductors, and multilayer actuators, to a conductive paste comprising the nickel powder, and a multilayer ceramic electronic component using the same.

2. Description of the Related Art

A multilayer ceramic electronic component (also referred to hereinbelow as "multilayer electronic component") is usually manufactured in the manner as follows. A ceramic starting material powder such as a dielectric, magnetic, or piezoelectric powder is dispersed in a resin binder and molded into sheets to obtain ceramic green sheets (referred to hereinbelow as "ceramic sheets"). A conductive paste for an internal electrode that is prepared by dispersing an inorganic powder comprising an electrically conductive powder as the main component and optionally a ceramic powder or the like in a vehicle comprising a resin binder and a solvent is printed according to a predetermined pattern on the ceramic sheet and dried to remove the solvent and form a dry film of the inner electrode. A plurality of ceramic sheets each having the dry film for the inner electrode that were thus obtained are laminated and pressurized to obtain a non-fired laminate in which the ceramic sheets and paste layers of inner electrodes are alternately laminated. The laminate is cut to a predetermined shape, then subjected to a binder removal process in which the binder is burned and dissipated, and fired at a high temperature whereby sintering of the ceramic layers and formation of the inner electrode layers are conducted simultaneously and a ceramic body is obtained. Terminal electrodes are then fused to both end surfaces of the body and a multilayer electronic component is obtained. The terminal electrodes and the unfired multilayer body are sometimes co-fired.

In recent years, powders of base metals such as nickel and copper are mainly used instead of powders of noble metals such as palladium and silver as electrically conductive powders of conductive pastes for inner electrodes. Accordingly, firing of the laminate is usually carried out in a nonoxidizing atmosphere with an extremely low partial pressure of oxygen in order to prevent the oxidation of the base metal during firing.

As a demand for miniaturized, highly multilayered electronic components has been growing in recent years, a rapid transition has been made to reducing the thickness of layers in both the ceramic layers and the inner electrode layers, in particular, in multilayer ceramic capacitors using nickel as an electrically conductive powder. As a result, ceramic sheets of smaller thicknesses came into use and also extremely fine nickel powder with a particle size of 1 μm or less, and even 0.5 μm or less, came into use for conductive pastes for inner electrodes.

However, such extremely fine nickel powders are easily sintered, the nickel particles are over-sintered during firing of the capacitor, voids appears in the inner electrodes due to grain growth, and a discontinuous film is obtained, causing increases in electrical resistance and disconnection. In addition, the electrode thickness increases, placing a limitation on the possible film thickness reduction. Furthermore, because the starting temperature of sintering is extremely low and sintering is started at an early stage during firing and also because volume expansion and shrinkage are induced by a redox reaction, the sintering shrinkage behavior does not match that of the ceramic layer, thereby causing structural defects such as delamination or cracking, which results in a lowering of yield and reliability.

In order to resolve such a problem, for example, Patent Document 1 discloses a nickel powder having a mean particle size of 0.1 to 0.8 μm and an oxygen content of 0.5 to 5.0 wt. % and is subjected to surface oxidation. Further, Patent Document 2 discloses a nickel powder having an oxide surface thereon with a certain thickness and this document states that using such a surface-oxidized nickel powder raises the starting temperature of sintering shrinkage, and prevents delamination and cracking as well as the increase in resistance caused by over-sintering. However, the study conducted by the inventors demonstrated that although an oxidized layer formed on the nickel powder surface, such as described in Patent Documents 1 and 2, is effective in preventing structural defects and an increase in the resistance value, the effect thereof is sometimes insufficient. In particular, problems associated with the decrease in capacitor characteristics, occurrence of structural defects, and decrease in reliability are sometimes encountered apparently due to incomplete decomposition of vehicle components in the binder removal process. Thus, in a nonoxidizing atmosphere such as a nitrogen atmosphere used in the binder removal process during firing, a nickel powder, which inherently has a high catalytic activity, acts as a catalyst for decomposition of the resin binder and tends to accelerate the decomposition process. However, if the mean particle size of the nickel powder is on the order of a submicron level, in particular, becomes 0.5 μm or less, the activity of the nickel powder itself further increases and part of the resin sometimes explosively decomposes at a temperature lower than the usual resin decomposition temperature, even when using the nickel powder subjected to surface oxidation by the method described in Patent Documents 1 and 2.

When a resin starts decomposition at a comparatively lower temperature, as described hereinabove, in a nonoxidizing atmosphere, then the resin is not completely decomposed and a carbonaceous residue that was left unburned is intertwined, for example, forming a graphite-like three-dimensional structure, and can hardly be dissipated. As a result, carbon remains in the inner electrode layer after the binder removal process, and when this residual carbon is oxidized in the subsequent process of ceramic sintering at a high temperature, gasified, and dissipated, it pulls oxygen out of the ceramic layer, thereby decreasing the strength of the ceramic body and also degrading electrical characteristics such as electrostatic capacity and insulation resistance. Furthermore, the residual carbon brings the melting of the nickel powder to a lower temperature side, thereby causing over-sintering and degrading the continuity of electrodes. In addition due to explosive decomposition of the resin, structural defects such as cracks sometimes occur in the body, and the properties and reliability of the electronic component are decreased. Therefore, although the catalytic activity of nickel powder is somewhat decreased when an oxidized layer is present on the nickel powder surface, as described in Patent Documents 1 and 2, the increase in the amount of residual carbon and the occurrence of structural defects caused by the above-described decomposition of the resin at a low temperature cannot be completely inhibited.

Patent Document 1: Japanese Patent Publication No. 10-106351 A.

Patent Document 2: Japanese Patent Publication No. 2000-45001 A.

SUMMARY OF THE INVENTION

An object of the present invention is to resolve the above-described problems and to provide a nickel powder that has a low activity despite an extremely small size and makes it possible to reduce the amount of residual carbon after the binder removal process when being used for forming an inner electrode, whereby the film thickness of the electrode can be reduced without causing the degradation of strength or electrical characteristics of electronic components or the generation of structural defects. Yet another object is to provide a conductive paste containing the nickel powder and further to obtain a multilayer ceramic electronic component having a high reliability and excellent electrical characteristics by using the paste.

The results of the comprehensive study conducted by the inventors demonstrated that carbon as an unavoidable impurity introduced from a nickel starting material or manufacturing process is usually present inside or on the surface of a nickel powder having the aforementioned oxidized surface layer, or carbon is sometimes introduced by surface treatment, and the thus introduced carbon greatly affects the oxidized layer on the nickel powder surface. The present invention was made based on this finding.

Thus, the present invention has the following features.

(1) A nickel powder with a mean particle size of 0.05 to 1.0 μm, the nickel powder comprising a thin oxidized layer of nickel on a surface thereof and having an oxygen content of 0.3 to 3.0 wt. % and a carbon content of 100 ppm or less per specific surface area of 1 $m^2/g$ of the powder, in a weight proportion of carbon to the nickel powder of unit weight.

(2) The nickel powder according to (1) above, in which the carbon content is 80 ppm or less per specific surface area of 1 $m^2/g$ of the powder, in a weight proportion to the nickel powder of unit weight.

(3) The nickel powder according to (1) or (2) above, in which the powder further comprises sulfur and the content thereof is 30 to 500 ppm per specific surface area of 1 $m^2/g$ of the powder, in a weight proportion to the nickel powder of unit weight.

(4) The nickel powder according to any one of (1) to (3) above, in which an areal proportion of a peak attributed to a bonding state between nickel and hydroxyl groups to all Ni 2p spectrum peaks is 60% or less in an analysis of a chemical bonding state of nickel of a nickel powder surface layer conducted by X-ray photoelectron spectroscopy (XPS).

(5) A conductive paste comprising the nickel powder of any one of (1) to (4) above, a resin binder, and a solvent.

(6) A multilayer ceramic electronic component in which inner electrodes are formed by using the conductive paste according to (5) above.

In accordance with the present invention, by controlling the content of carbon to a specific amount or less than that in a nickel powder having a specific amount of an oxidized surface layer, the amount of residual carbon after the binder removal process can be greatly reduced and degradation of properties or occurrence of cracks can be prevented even with an extremely fine powder with a mean particle size of 0.05 to 1.0 μm, in particular with a mean particle size of 0.5 μm or less. The decrease in the amount of residual carbon is apparently due to the decrease in catalytic activity of nickel and inhibited decomposition of resin at a low temperature that result from improved continuity and stability of the oxidized surface layer of the nickel powder. Accordingly, a multilayer ceramic electronic component with excellent continuity of electrode film, no structural defects, and excellent electric properties and strength can be obtained. Furthermore, a highly reliable multilayer ceramic electronic component can be obtained even in the case of highly multilayered articles with thin ceramic layers and thin inner electrode layers.

In particular, when the nickel powder in accordance with the present invention additionally contains a specific amount of sulfur, the activity of nickel can be further decreased, and because practically no sulfur component remains after firing, an excellent property improvement effect is demonstrated.

Furthermore, by controlling the quantity of hydroxyl groups bonded to the nickel powder surface, the occurrence of undesirable decomposition of resin at a low temperature can be further prevented and the degradation of properties and occurrence of cracking can be prevented.

Moreover, a multilayer ceramic electronic component in which inner electrodes are formed by using the conductive paste is free of structural defects and has excellent electrical properties and high reliability.

DETAILED DESCRIPTION OF THE PREFERRED EMBODIMENTS

In the nickel powder in accordance with the present invention, a thin oxidized layer of nickel is formed on the surface, and the total amount of oxygen contained in the powder has to be 0.3 to 3.0 wt. %, in a proportion to the nickel powder. If the amount of oxygen is less than 0.3 wt. %, the thickness of the oxidized layer decreases and the surface cannot be uniformly coated. As a result, the effect of decreasing the activity of nickel is reduced. Furthermore, if the amount of oxygen exceeds 3.0 wt. %, generation of gas and volume changes caused by the reduction of nickel oxide during firing in a reducing atmosphere increase and a dense electrode film cannot be obtained. At the same time, cracking and delamination of the multilayer electronic component are induced. A range of 0.5 to 2.0 wt. % is especially preferred. In the present invention, the amount of oxygen in nickel powder is represented by the ignition weight loss by heating in a reducing atmosphere (referred to hereinbelow simply as "ignition loss") which is measured as a weight variation percentage when the powder is heated from room temperature to 900° C. in a reducing atmosphere composed of a $N_2$ atmosphere containing 4% $H_2$. The ignition loss measured by this method essentially includes all the components that are contained in the nickel powder and volatilized by heating, but because the content of volatile components other than oxygen, such as carbon, and sulfur, in the nickel powder in accordance with the present invention is extremely small by comparison with that of the amount of oxygen, the amount of oxygen in the nickel powder can be approximately represented by the ignition loss.

If the mean particle size of the nickel powder is less than 0.05 μm, the activity becomes too high and decomposition of resin at a low temperature or sintering of the nickel powder at a low temperature cannot be inhibited. Furthermore, when a conductive paste is manufactured, a large amount of organic components, such as a solvent and a dispersant, is necessary to disperse the nickel powder in the paste and obtain the adequate viscosity characteristics. As a result, a dense electrode dry film is difficult to obtain. Furthermore, in order to decrease the thickness of the inner electrode to meet the requirement relating to the miniaturization and increase in the number of laminated layers in multilayer electronic components, the mean particle size of nickel powder has to be 1.0 μm or less. In particular, to form a thin inner electrode layer of a high density and smoothness, it is preferred to use an extremely fine powder with a good dispersivity that has a mean particle size of 0.1 to 0.5 μm and a specific surface area of 1.5 to 6.0 $m^2/g$. In accordance with the present invention, a remarkable effect is demonstrated with the powder with a mean particle size of 0.3 μm or less that has a very high activity. Furthermore, in accordance with the present invention, unless specified otherwise, the mean particle size of the powder represents a particle size calculated from a specific surface area measured by a BET method.

<Content of Carbon>

The present invention is characterized in that the content of carbon in such a nickel powder having an oxidized surface layer is controlled to an extremely low level.

Japanese Patent Publication No. 2001-284161A discloses that if carbon is contained at 0.02 to 15 wt. % in a fine nickel powder with a mean particle size of 1.0 μm or less, the discontinuity and film thickness increase in the electrode are prevented and sintering is effectively delayed. However, when such a fine nickel powder was used in the prior art, it was thought that the introduction of carbon into the nickel powder produced the effect of inhibiting the discontinuity and film thickness increase in the electrode. However, the research conducted by the inventors suggested that when an oxidized layer is formed in a certain amount on the surface of a nickel particle with the object of decreasing the catalytic activity and raising the sintering start temperature, if carbon is present inside the nickel particle or on the surface thereof, a dense continuous oxidized layer can hardly be obtained. Furthermore, it was assumed that the carbon reduces the oxidized surface layer of nickel at a comparatively low temperature during firing and the active surface of the nickel metal is partially exposed, thereby making it impossible to obtain the originally purposed effects, that is, inhibition of sintering and prevention of the decomposition of the resin at a low temperature.

The results of investigating the method for controlling the carbon content to an extremely low value demonstrated that controlling the content of carbon in a nickel powder having the above-described specific particle size and an oxidized surface layer to a specific amount to 100 ppm or less per specific surface area of 1 $m^2/g$ of the powder, in a weight proportion (calculated as carbon atoms) of a carbon component to the nickel powder of unit weight, could inhibit the decomposition of the resin at a low temperature, degradation of capacitor characteristics caused by the increase in the amount of residual carbon resulting from the decomposition, and the occurrence of structural defects. The apparent reason therefor is that a continuous and dense oxidized layer is maintained with a good stability on the surface of nickel particles, at least until the temperature at which the resin is decomposed at a low-temperature stage of the firing process is attained. In particular, it is especially preferred that the content of carbon be 80 ppm or less per specific surface area of 1 $m^2/g$ because an extremely good effect can be obtained. No restriction is placed on the lower limit of the amount of carbon, and the lower is this amount, the better results are obtained. However, because carbon is inherently contained as an unavoidable impurity, it is technologically difficult to remove the carbon completely, and cost limitations are also applied. Furthermore, from the standpoint of effect, after the amount of carbon is decreased to a certain level, the effect produced is almost the same and no additional substantial effect is obtained. For this reason, and also with the aforementioned consideration for cost, it is practically preferred that the amount of carbon be about 30 ppm to 80 ppm per specific surface area of 1 $m^2/g$.

The amount of carbon as referred to in accordance with the present invention is a sum total of all the carbon present inside the nickel powder and on the surface thereof and can be measured, for example, by a commercial carbon-sulfur analyzer. Carbon contained in the nickel powder includes carbon included as an unavoidable impurity from the nickel starting material and manufacturing process and also carbon that is introduced by an organic-system surface treatment conducted on the nickel powder. Such surface treatment is mainly conducted to increase the dispersivity of the nickel powder in an organic vehicle when the nickel powder is used in a conductive paste. Practically, in most of the treatment methods using an organic surface treatment agent that is effective in terms of increasing dispersivity, the treatment agent is strongly adhered to the nickel powder surface. Therefore, similarly to the carbon contained in the nickel powder, this agent adversely affects the oxidized surface layer.

Furthermore, in accordance with the present invention, the specific surface area is a specific surface area measured by a BET method. Furthermore, the expression "100 ppm or less per specific surface area of 1 $m^2/g$ of the powder" means that if the specific surface area of the nickel powder is taken as $m^2/g$, then the carbon content is (a×100) ppm or less based on the weight of the nickel powder, that is, $100 \times 10^{-6}$ g or less based on a surface area of 1 $m^2$ of the nickel powder.

<Content of Sulfur>

In accordance with the present invention, an even better effect is demonstrated if a controlled amount of sulfur component is contained in the nickel powder. Sulfur apparently acts so as to decrease the catalytic activity of the nickel powder. The optimum content thereof is determined by the surface area of the nickel powder and is 30 to 500 ppm or less per specific surface area of 1 $m^2/g$ of the powder, in a weight proportion (calculated as sulfur atom) to the nickel powder of unit weight. If the content of sulfur is less than 30 ppm, the effect of adding sulfur is not demonstrated. If the content of sulfur is more than 500 ppm, sulfur remains in the multilayer component after firing and tends to degrade the properties. Furthermore, if a large amount of sulfur component is volatilized during the firing of the multilayer component, problems associated with the contamination of the firing furnace occur. The especially preferred range is 80 to 400 ppm. The amount of sulfur is measured, similarly to the amount of carbon, by a commercial carbon-sulfur analyzer or the like.

<Hydroxyl Groups>

In accordance with the present invention, it is preferred that the amount of hydroxyl groups bonded to the nickel powder surface be as low as possible. When a large number of hydroxyl groups are bonded to the surface of the nickel powder, the resin will decompose even more vigorously at an early stage of firing at a comparatively low temperature. Furthermore, if the amount of hydroxides on the nickel powder surface is high, the dispersivity of the nickel powder in the organic vehicle tends to decrease. Therefore, controlling the amount of hydroxyl groups on the surface so that areal proportion of a peak attributed to a bonding state between nickel and hydroxyl groups to all the Ni 2p spectrum peaks is 60% or less in an analysis of a chemical bonding state of nickel of the nickel powder surface layer conducted by X-ray photoelectron spectroscopy (XPS) can inhibit the decomposition of a resin at a low temperature and reliably prevent the degradation of properties or occurrence of cracking.

<Manufacturing Method>

A wet reduction method, a method of thermally decomposing a nickel compound, a chemical vapor deposition method (CVD) based on the reduction of a nickel compound in the gas phase, and a physical vapor deposition method (PVD) based on cooling a nickel vapor may be used as methods for manufacturing the nickel powder in accordance with the present invention. In particular, a spray pyrolysis method described in Japanese Examined Patent Publication No. 63-31522B, a method described in Japanese Patent Publications No. 2002-20809A and 2004-99992A by which a thermally decomposable metal compound powder is supplied together with a carrier gas into a reaction container and thermal decomposition is carried out in a state where this compound is dispersed in a gas phase, or a PVD method by which a metal vapor is produced by heating the metal, and a metal powder is then generated by cooling and condensation of the vapor are preferred because such methods make it possible to obtain ultrafine nickel powders with a high crystallinity and extremely high dispersivity.

In order to form an oxidized surface layer in those methods, for example, the nickel powder produced is heated in an oxidizing atmosphere, while preventing the aggregation of particles, thereby causing the prescribed level of surface oxidation. More specifically, the appropriate amount of oxidation can be attained without causing strong aggregation, by heating the nickel powder for about 1 to 10 hours in air at a temperature of 200° C. or less. Furthermore, the above-described CVD method, PVD method, spray pyrolysis method, or a method of thermally decomposing a metal compound powder in a gas phase are preferred because a uniform oxidized layer can be formed on the nickel powder, without causing aggregation of the powder by mixing the powder with an oxidizing gas such as air, in a state where the nickel powder generated inside the reactor is effectively dispersed in the gas phase. In this case, the amount of surface oxidation of the produced powder can be regulated, for example, by the temperature at which the produced particles come into contact with the oxidizing gas.

The surface oxidizing treatment may be conducted separately from or simultaneously with the below-described treatment for decreasing the carbon content or the treatment of adding sulfur. However, if the oxidation treatment is conducted prior to the carbon amount decrease treatment, the oxidized layer on the surface of nickel powder is reduced when carbon is removed, thereby causing the aggregation of particles. Therefore, it is preferred that the oxidation treatment be conducted after the removal of carbon or simultaneously therewith.

Of the nickel powders that can be obtained by the above-described methods, a nickel powder obtained, for example, by a wet reduction method or a method of reducing carbonyl nickel in a gas phase usually contains a comparatively large amount of carbon as an impurity. With the CVD method, PVD method, spray pyrolysis method, and method for thermal decomposition of a metal compound powder in a gas phase, the residual quantity of carbon is comparatively low, but still the powder contains carbon in an amount larger that the range stipulated by the present invention. Furthermore, the amount of carbon varies depending on the starting materials or equipment.

No specific limitation is placed on the method for decreasing the content of carbon in the nickel powder to the range specified by the present invention. For example, a method can be employed by which the carbon component is burned and removed by heat-treating the nickel powder in air at a temperature of 100 to 200° C. or by decomposing and removing the carbon with steam. For example, when a nickel carboxylate powder containing carbon is used as a starting material in a method of thermally decomposing a metal compound powder in a gas phase that is described in Japanese Patent Publication No. 2002-20809A, the carbon component can be burned and removed by introducing steam or oxygen into a heating zone or cooling zone of a reaction vessel. An adequate amount of steam reacts with the carbon component, effectively decreasing the amount of carbon remaining in the powder produced, and the amount of carbon contained in the powder can be controlled by changing the amount of steam supplied. If excess steam is supplied, the amount of hydroxyl groups present on the surface of the produced powder tends to increase.

No specific limitation is placed on the method for introducing the controlled amount of sulfur component. For example, a method by which nickel powder is mixed with a sulfur powder and the mixture is heated in a sealed container or a method by which a gas containing sulfur, such as hydrogen sulfide gas or sulfurous acid gas, is caused to flow through and react with nickel powder can be used. Furthermore, In the CVD method, PVD method, spray pyrolysis method, and method for the thermal decomposition of a metal compound powder in a gas phase, adding hydrogen sulfide gas, sulfurous acid gas, a mercaptan-type organosulfur compound gas, or the like to the reaction zone makes it possible to obtain a nickel powder containing sulfur. Those gases decompose in the reaction zone and the produced sulfur component is almost quantitatively introduced into the nickel powder. Therefore, the amount of sulfur in the powder can be controlled by varying the supplied amount of gas. Furthermore, with the spray pyrolysis method, a decomposable sulfur compound such as sulfuric acid, thiosulfuric acid or the like is dissolved in a starting material solution, thereby enabling the introduction of the predetermined amount of sulfur at the same time as the nickel powder is formed.

<Conductive Paste>

The conductive paste in accordance with the present invention comprises the nickel powder as an electrically conductive powder and has this powder dispersed in a vehicle comprising a resin binder and a solvent.

No specific limitation is placed on the resin binder, and the binders that have been usually used in conductive pastes can be used. Examples of such binders include cellulose resins (e.g., ethyl cellulose, hydroxyethyl cellulose, etc.), acrylic resins, methacrylic resins, butyral resins, epoxy resins, phenolic resins, and rosin. No specific limitation is placed on the compounded amount of the resin binder. Usually, this amount is about 1 to 15 parts by weight per 100 parts by weight of the electrically conductive powder.

No specific limitation is placed on the solvent, provided that it can dissolve the above-mentioned binder resin, and the solvents that have been usually used in pastes for inner electrodes can be appropriately selected and blended. For example, organic solvents such as alcohols, ethers, esters, and hydrocarbons, water, or mixtures thereof can be used. No specific limitation is placed on the amount of solvent and the usual amount thereof can be used. This amount is appropriately selected according to the properties of the electrically conductive powder, type of the resin, and application method. Usually the solvent is used in an amount of about 40 to 150 parts by weight per 100 parts by weight of the electrically conductive powder.

In addition to the above-described components, the conductive paste in accordance with the present invention can contain other components that are usually used. Thus, inorganic powders such as ceramics having the composition identical or close to that of the ceramic contained in the ceramic sheet, glass, metal oxides such as alumina, silica, copper oxide, manganese oxide, and titanium oxide, and montmorillonite, organo-metallic compounds, plasticizers, dispersants, and surfactants can be appropriately compounded according to the object.

The electrically conductive paste in accordance with the present invention can be manufactured by the usual method by mixing and kneading the nickel powder and other additional components together with the binder resin and solvent, thereby uniformly dispersing the nickel powder. The conductive paste in accordance with the present invention is not limited to the paste form and may be in the form of a paint or ink. The electrically conductive paste thus obtained can be used for forming inner electrodes of multilayer ceramic electronic components in particular, multilayer capacitors, multilayer inductors, multilayer actuators, and so on. Also, the conductive paste can be used for forming terminal electrodes of ceramic electronic components or thick conductor circuits.

<Multilayer Ceramic Electronic Component>

The multilayer ceramic electronic component is manufactured by the known method by using the conductive paste in accordance with the present invention for forming inner electrodes. A method for manufacturing a multilayer ceramic capacitor will be described below by way of an example.

First, a dielectric ceramic starting material powder is dispersed in a resin binder, the dispersion is formed into sheets, by a doctor blade method or the like, and ceramic sheets are fabricated. Usually, a powder comprising, as the main component, a perovskite-type oxide of a barium titanate, strontium zirconate, and calcium strontium zirconate, or a compound obtained by replacing some of the metal elements constituting such oxides with other metal elements can be used as the dielectric ceramic starting material powder. If necessary, a variety of additives for adjusting the capacitor characteristics can be mixed with those starting material powders. The conductive paste in accordance with the present invention is coated on the ceramic sheets obtained by using the usual method such as screen-printing and dried to remove the solvent and form a dry film of the inner electrode paste of the predetermined pattern. The predetermined number of ceramic sheets having formed thereon the dry films of the inner electrode paste are stacked and laminated under pressure to fabricate an unfired multilayer body. The multilayer body is cut to the predetermined shape, treated to remove the binder at a temperature of about 250 to 350° C. in an inert gas atmosphere or an inert gas atmosphere comprising a small amount of oxygen, thereby decomposing and dissipating the vehicle components. The multilayer body is then fired at a high temperature of about 1100 to 1350° C. in a nonoxidizing atmosphere to sinter the dielectric layers and electrode layers, and a re-oxidizing treatment is further conducted, if necessary, to obtain a multilayer ceramic capacitor body. Terminal electrodes are thereafter formed by firing on both end surfaces of the multilayer ceramic capacitor body. The terminal electrodes may be also formed by applying a conductive paste onto both end surfaces of the chip obtained by cutting the unfired multilayer body and then co-firing with the multilayer body.

The present invention will be described below in greater detail based on examples thereof, but the present invention is not limited to those examples.

EXAMPLES

A powder of nickel acetate tetrahydrate with a mean particle size of about 100 μm was supplied to a jet mill at a supply rate of 500 g/hr and pulverized and dispersed with a nitrogen gas at a flow rate of 200 L/min. The dispersion gas flow was introduced as is into a reaction tube located inside an electric furnace heated at a temperature of 1550° C., and the nickel acetate tetrahydrate was heated and decomposed to produce a nickel powder. The amount of carbon contained in the powder was decreased in this process by supplying steam from the vicinity of the port for introducing the dispersion gas flow into the reaction tube. The amount of carbon contained in the powder was controlled by the supplied amount of steam. Furthermore, a cooling pipe of the same diameter as the reaction tube was connected to the outlet port side of the reaction tube, a plurality of introducing pipes for introducing air were provided in the flow direction of gas in the cooling pipe, and the surface oxidation quantity of the produced powder was controlled by changing the temperature at which the produced particles come into contact with air according to the position in which the air was introduced. When sulfur was introduced (sample numbers 11 to 14), hydrogen sulfide gas was separately supplied from the vicinity of the port for introducing the dispersion gas flow to the reaction tube, in the same manner as the steam. The amount of sulfur introduced in the powder was controlled by the supplied quantity of the hydrogen sulfide gas. The powder produced was recovered with a bag filter.

The nickel powders of sample numbers 1 to 15 (sample numbers 3, 4, 8, 10 are outside the scope of the present invention) were observed under a scanning electron microscope (SEM), and the formation of spherical particles was confirmed under all conditions. Furthermore, the formation of an oxidized layer on the surface of the particles was also confirmed by observations under a scanning transmission electron microscope (STEM).

The specific surface area, mean particle size, oxygen content (ignition loss), carbon content, sulfur content, and proportion of surface hydroxyl groups were studied for each nickel powder. The results are shown in Table 1. The specific surface area was measured by a BET method. The mean particle size is a particle size calculated from the specific surface area. The ignition loss was represented as a weight variation percentage (%) by weighing about 2 g of the powder in an alumina boat, heating from room temperature to 900° C. in a $N_2$ atmosphere containing 4% $H_2$, cooling to room temperature, and measuring the variation of weight. The carbon content and sulfur content were measured with a carbon-sulfur analyzer (manufactured by Horiba Ltd., EMIA-320V). As for the proportion of surface hydroxyl groups, a Ni 2p spectrum of the powder surface was measured by XPS (KRATOS ANALYTICAL Co., Ltd., ESCA-3400), this spectrum was deconvoluted, and the proportion of the peak area attributed to a bonding of nickel and hydroxyl groups with respect to the total peak area in the Ni 2p spectrum was examined.

A total of 100 parts by weight of the nickel powders of sample numbers 1 to 15, 5 parts by weight of ethyl cellulose as a resin binder, and 95 parts by weight of dihydroterpineol were mixed and kneaded by using a three-roll mill to manufacture a conductive paste. The evaluation of binder removal characteristic of each of the conductive pastes thus obtained was conducted as follows. The conductive paste was applied onto a PET film to obtain a film thickness of 250 μm and dried at 150° C. to remove the solvent component. The dried film was heated to 500° C. at a temperature rising rate of 20° C./min in a nitrogen gas atmosphere, and the decomposition initiation temperature of the resin was evaluated by conducting thermogravimetric measurements. The residual carbon amount was measured with respect to a sample obtained by heat treating the dried film for 3 hours at 300° C. in a nitrogen gas atmosphere. The results are shown in Table 1.

TABLE 1

| Sample No. | Specific surface area (m²/g) | Mean particle size (μm) | Ignition loss(%) | Carbon content in powder (ppm) | Carbon content per specific surface area 1 m²/g (ppm) | Sulfur content in powder (ppm) | Sulfur content per Specific surface area 1 m²/g (ppm) | Proportion of surface hydroxyl groups (%) | Decomposition initiation temperature of resin (° C.) | Residual amount of carbon (%) | Continuity of electrodes (%) |
|---|---|---|---|---|---|---|---|---|---|---|---|
| 1 | 3.3 | 0.20 | 1.4 | 230 | 70 | <20 | <6 | 51 | 330 | 0.65 | 88 |
| 2 | 3.2 | 0.21 | 1.5 | 270 | 84 | <20 | <6 | 52 | 330 | 0.72 | 86 |
| 3* | 3.2 | 0.21 | 1.4 | 360 | 113 | <20 | <6 | 49 | 300 | 0.91 | 78 |
| 4* | 3.2 | 0.21 | 1.4 | 510 | 159 | <20 | <6 | 50 | 290 | 1.1 | 72 |
| 5 | 3.5 | 0.19 | 0.8 | 210 | 60 | <20 | <6 | 52 | 320 | 0.71 | 85 |
| 6 | 3.4 | 0.20 | 0.5 | 250 | 74 | <20 | <6 | 55 | 320 | 0.79 | 84 |
| 7 | 3.4 | 0.20 | 0.3 | 270 | 79 | <20 | <6 | 56 | 310 | 0.85 | 81 |
| 8* | 3.3 | 0.20 | 0.2 | 250 | 76 | <20 | <6 | 55 | 290 | 1.0 | 74 |
| 9 | 3.4 | 0.20 | 1.9 | 240 | 71 | <20 | <6 | 52 | 330 | 0.63 | 85 |
| 10* | 3.4 | 0.20 | 3.5 | 220 | 65 | <20 | <6 | 52 | 330 | 0.62 | 69 |
| 11 | 3.4 | 0.20 | 1.5 | 210 | 62 | 1600 | 471 | 50 | 350 | 0.41 | 92 |
| 12 | 3.3 | 0.20 | 1.4 | 250 | 76 | 810 | 245 | 51 | 340 | 0.47 | 91 |
| 13 | 3.1 | 0.22 | 1.3 | 210 | 68 | 580 | 187 | 55 | 340 | 0.57 | 88 |
| 14 | 3.3 | 0.20 | 1.6 | 220 | 67 | 120 | 36 | 51 | 330 | 0.63 | 88 |
| 15 | 3.3 | 0.20 | 1.7 | 200 | 61 | <20 | <6 | 65 | 310 | 0.83 | 81 |

*Outside the scope of the present invention

A comparison of sample numbers 1 to 4 of Table 1 demonstrates that when the specific surface area and oxygen content are the same or almost the same, the higher the carbon content, the lower the decomposition initiation temperature of the resin in the conductive paste and the larger the residual carbon amount after the heat treatment. Furthermore, a comparison of sample number 1 and sample numbers 5 to 10 demonstrates that if the oxygen content is low, the decomposition initiation temperature drops and the residual carbon amount increases. Conversely, when the oxygen content is above a certain level, practically no changes occur with respect to the decomposition initiation temperature. A comparison of sample numbers 11 to 14 demonstrates that if sulfur is contained, the decomposition initiation temperature rises and the residual carbon amount decreases. The results obtained for sample number 15 indicate that if the amount of surface hydroxyl groups is large, the decomposition initiation temperature tends to lower and the residual carbon amount tends to increase.

The conductive pastes were then printed in the predetermined pattern on barium titanate ceramic green sheets and dried to form dry films of conductive pastes serving as inner electrodes. The green sheets having the dry films of conductive pastes were stacked to obtain 30 dielectric effective layers, pressed together, and then cut to the predetermined dimensions to obtain unfired multilayer capacitor chips. The unfired chips were subjected to a binder removal treatment for 12 hours at a temperature of 300° C. in a nitrogen gas atmosphere and then fired for 2 hours at a peak temperature of 1250° C. in a weakly reducing atmosphere comprising nitrogen gas containing hydrogen. Multilayer ceramic capacitor bodies were then fabricated by conducting re-oxidation treatment for 1 hour at a temperature of 1000° C. in a weakly oxidizing atmosphere.

Five multilayer ceramic capacitor bodies for each sample that were thus obtained were cut along the plane perpendicular to the inner electrodes and continuity of the electrodes was examined by observing the cross-section. The results are shown in Table 1. The continuity of electrodes was determined as follows. Based on the photograph of the capacitor cross-section, a central line was drawn in electrodes of 10 layers selected therefrom, and the ratio of the length obtained by subtracting the disconnection portions from the entire length was calculated in percentage. The higher the percentage figure, the better the continuity.

The evaluation results relating to the continuity of electrodes demonstrate that the continuity tends to increase with a decrease in the residual carbon amount. Furthermore, even when the residual carbon amount is small, when the oxygen content is too high (sample number 10), the continuity of the electrodes decreases, and when the ratio of surface hydroxyl groups is high (sample number 15), the continuity of the electrodes tends to decrease.

What is claimed is:

1. A nickel powder having a mean particle size of 0.05 to 1.0 μm and comprising a thin oxidized layer of nickel on a surface thereof, an oxygen content of 0.3 to 3.0 wt. %, carbon content of no more than 100 ppm per specific surface area of 1 m²/g of the powder, in a weight proportion of carbon to the nickel powder of unit weight, and sulfur content of 30 to 500 ppm per specific surface area of 1 m²/g of the powder, in a weight proportion of sulfur to the nickel powder of unit weight.

2. The nickel powder of claim 1, wherein the mean particle size is no greater than 0.5 μm.

3. The nickel powder of claim 2, wherein the powder has a specific surface area of 1.5 to 6.0 m²/g.

4. The nickel powder of claim 1, wherein the oxygen content is from 0.5 to 2.0 wt. %.

5. The nickel powder according to claim 1, in which the carbon content is 80 ppm or less per specific surface area of 1 m²/g of the powder, in a weight proportion to the nickel powder of unit weight.

6. The nickel powder according to claim 1, in which an areal proportion of a peak attributed to a bonding state of nickel and hydroxyl groups to all Ni 2p spectrum peaks is 60% or less in an analysis of a chemical bonding state of nickel of the nickel powder surface layer conducted by X-ray photoelectron spectroscopy (XPS).

* * * * *